US007246552B2

(12) United States Patent
Schroeder

(10) Patent No.: US 7,246,552 B2
(45) Date of Patent: Jul. 24, 2007

(54) PISTON HAVING ASYMMETRICAL PIN BORE SLOT PLACEMENT

(75) Inventor: Kenneth E. Schroeder, Sanford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/263,178

(22) Filed: Oct. 31, 2005

(65) Prior Publication Data

US 2007/0095200 A1  May 3, 2007

(51) Int. Cl.
*F16J 1/16* (2006.01)
*F02F 3/00* (2006.01)

(52) U.S. Cl. .......................................... 92/187; 403/150

(58) Field of Classification Search .................. 92/187; 403/150, 152
See application file for complete search history.

(56) References Cited

U.S. PATENT DOCUMENTS 3,626,815 A * 12/1971 Fingeroot et al. ............... 92/90
4,534,274 A * 8/1985 Ripberger et al. ............. 92/187
4,683,808 A * 8/1987 Wacker et al. ................. 92/208
4,730,547 A * 3/1988 Murray ......................... 92/160
5,331,932 A * 7/1994 Watanabe et al. ......... 123/193.6
6,279,456 B1 * 8/2001 Ueshima et al. .............. 92/187
6,513,477 B1 * 2/2003 Gaiser et al. ............. 123/193.6

FOREIGN PATENT DOCUMENTS

JP          11200945 A  *  7/1999

* cited by examiner

*Primary Examiner*—Thomas E. Lazo
(74) *Attorney, Agent, or Firm*—Christopher DeVries

(57) ABSTRACT

A piston, having a first side subject to major thrust loading and a second side subject to minor thrust loading, is provided. The piston has a crown portion and a first and second pin boss portion depending therefrom. An axially extending pin bore is provided within the first and second pin boss portions. A first axially extending slot is provided within the piston pin bore on the first side. Additionally, a second axially extending slot is provided within the piston pin bore on the second side of the piston. The second axially extending slot is positioned closer to the crown portion than the first axially extending slot. The first and second axially extending slots are generally concave in shape.

15 Claims, 2 Drawing Sheets

PISTON HAVING ASYMMETRICAL PIN BORE SLOT PLACEMENT

TECHNICAL FIELD

The present invention relates to pistons for an internal combustion engine.

BACKGROUND OF THE INVENTION

Internal combustion engines may utilize pistons, which are mounted for reciprocal movement within corresponding cylinders. The mounting of a piston within a cylinder involves the use of a connecting rod having a lower end journaled to a rotatable crankshaft and an upper end similarly attached to a piston pin extending in a diametrical pin bore within pin boss portions of the piston. The piston pin in a typical piston is supported at its ends by the pin bosses such that the piston pin acts as a journal with the pin bore functioning as a supporting bearing. The upper end of the connecting rod engages the piston pin intermediate of its piston-supported ends, thus completing the connection of the piston with the rotatable crankshaft. The piston pin to pin bore interface is a highly stressed area requiring proper lubrication and design to ensure adequate performance and reliability of the piston assembly.

SUMMARY OF THE INVENTION

A piston is provided having a major thrust side subject to major thrust loads and a minor thrust side subject to minor thrust loads. The piston includes a crown portion and at least one piston pin boss portion extending from the crown portion and defining a generally circumferential piston pin bore surface. A first axial slot is formed within the piston pin bore. The first axial slot is provided on the major thrust side of the piston. A second axial slot is formed within the piston pin bore. The second axial slot is provided on the minor thrust side of the piston. The second axial slot is provided closer to the crown portion, within the piston pin bore, than the first axial slot.

The first and second axial slots may be generally concave in shape. The piston pin bore surface has a first contact area provided proximate to the first axial slot, and the first axial slot is operable to provide lubricant to the first contact area. The first axial slot has a trailing edge provided substantially adjacent to the first contact area. Additionally, the piston pin bore surface has a second contact area provided proximate to the second axial slot. The second axial slot is operable to provide lubricant to the second contact area. The second axial slot has a trailing edge provided substantially adjacent to the second contact area.

In another aspect of the present invention, a piston is provided having a crown portion with a first skirt portion depending from the crown portion and is subject to major thrust loading. A second skirt portion depends from the crown portion and is subject to minor thrust loading. A first pin boss portion is integrally formed with the crown portion and disposed between the first and second skirt portions. A second pin boss portion, formed integrally with the crown portion, is spaced axially from the first pin boss portion. The second pin boss portion is disposed between the first and second skirt portions. The first and second pin boss portions define an axially extending piston pin bore having a generally circumferential surface and operable to receive a piston pin. A first axially extending slot is formed in the piston pin bore on the side of the piston subject to major thrust loading and a second axially extending slot is formed in the piston pin bore on the side of the piston subject to minor thrust loading. The first and second axially extending slots are generally concave in shape and the second axially extending slot is provided in the piston pin bore closer to the crown portion than the first axially extending slot.

The first and second axially extending slot may extend the entire length of the piston pin bore. The circumferential surface has a first contact area provided proximate to the first axially extending slot and operable to provide a bearing surface for the piston pin. The first axially extending slot is operable to provide lubricant to the first contact area. The first axially extending slot has a trailing edge provided substantially adjacent to the first contact area. The circumferential surface has a second contact area provided proximate to the second axially extending slot and operable to provide a bearing surface for the piston pin. The second axially extending slot is operable to provide lubricant to the second contact area. The second axially extending slot has a trailing edge provided substantially adjacent to the second contact area.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
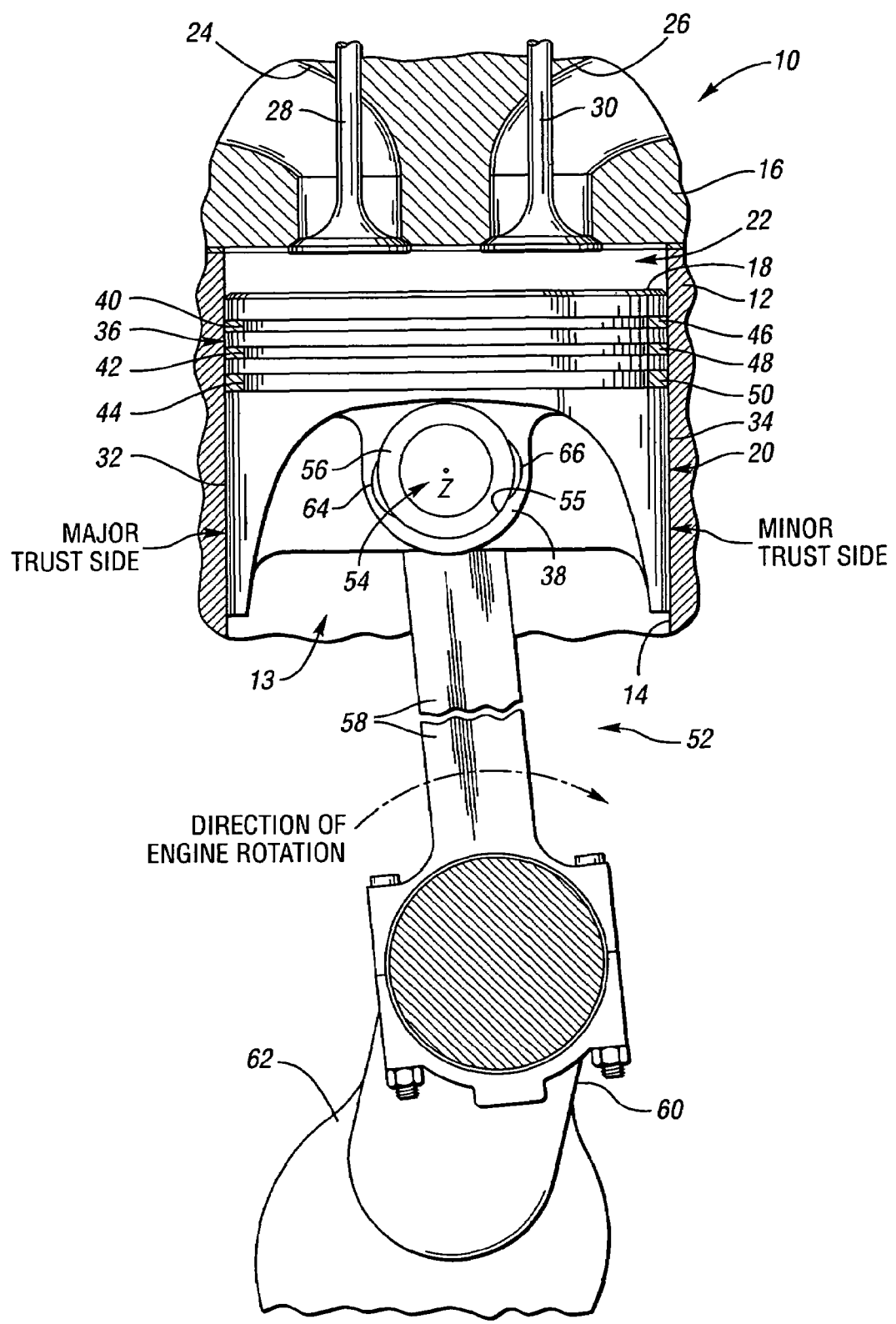
FIG. 1 is a transverse sectional fragmentary view, partly in elevation, of an internal combustion engine illustrating a piston consistent with the present invention.

Referring to FIG. 1 of the drawings, there is shown an internal combustion engine generally indicated by the numeral 10. The engine 10 includes a cylinder case 12 defining a plurality of cylinder bores 13 having generally cylindrical walls 14, only one of which is shown and described. Closing one end of the cylinder bore 13 is a cylinder head 16, which cooperates with a crown portion 18 of a piston 20 to define a variable volume combustion chamber 22. The cylinder head 16 defines intake and exhaust ports 24 and 26, which are selectively opened by poppet valves 28 and 30, respectively. The intake and exhaust ports 24 and 26 are provided in selective communication with the combustion chamber 22 to provide for the introduction of air or an air-fuel mixture into the combustion chamber 22 and the exhaust of products of combustion from the combustion chamber 22.

The piston 20 has a first skirt portion 32 and a generally opposite second skirt portion 34 depending from the crown portion 18. An annular ring belt portion 36 extends peripherally between the crown portion 18 and the first and second skirt portions 32 and 34. A first pin boss portion 38 and a second pin boss portion 39 (shown in FIG. 2), disposed opposite the first pin boss portion 38, depends or extends from the crown portion 18 and are provided between the first and second skirt portions 32 and 34. The ring belt portion 36, shown in FIG. 1, is provided with a plurality of circumferential axially spaced piston ring grooves which, in the present instance, consist of a first ring groove 40 extending closest to the crown portion 18, a second ring groove 42 spaced from the first ring groove 40 in a direction away from the crown portion 18, and a third ring groove 44 spaced from the second ring groove 42 in a direction further from the crown portion 18.

The first ring groove 40 is provided with a first compression ring 46. The second ring groove 42 is provided with a second compression ring 48. The third ring groove 44 is provided with an oil control ring 50. The first and second compression rings, 46 and 48, have a dual purpose to seal the combustion chamber 22 against the escape of pressurized gases therein to a crankcase 52 and to limit the passage of lubricating oil from the engine cylinder wall 14 into the combustion chamber 22.

The piston 20 is arranged for slidable reciprocating motion within the cylinder bore 13. The first and second piston skirt portions 32 and 34 are engageable to guide the piston 20 in its reciprocating motion and to absorb thrust forces that may be imposed upon the piston 20 by the cylinder wall 14. The crown portion 18, as mentioned above, forms one wall of the combustion chamber 22 that, upon movement of the piston 20, causes the expansion or contraction of the combustion chamber 22 as is required for operation in an internal combustion engine working cycle.

Figure 2:
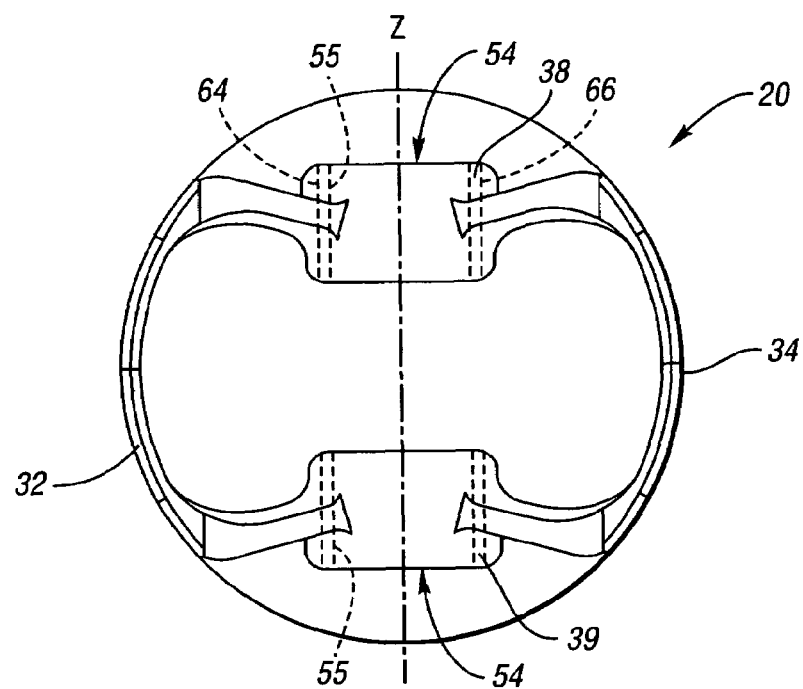
FIG. 2 is a bottom elevational view of the piston shown in FIG. 1.

To utilize the piston 20 as a means for developing power, the piston 20 is provided with a piston pin bore 54, having a generally circumferential pin bore surface 55 and extending axially through the first pin boss portion 38 and the second pin boss portion 39, shown in FIG. 2. The piston pin bore 54 is dimensioned to receive a piston pin 56. The piston pin 56 connects the piston 20 through a connecting rod 58 with an eccentric throw 60 of a crankshaft 62. Reciprocation of the piston 20 within the cylinder bore 13 causes the rotation of the crankshaft 62. The angular position of the connecting rod 58 with respect to the bore 13 varies as the crankshaft 62 rotates so that forces acting on the piston 20 in an axial direction are resolved partially into a side thrust component which alternately acts in opposite directions transversely on the piston, causing thrust forces between the first and second piston skirt portions 32 and 34 and the cylinder wall 14. Since a large part of the piston forces are due to gas pressures within the combustion chamber 22, the thrust forces acting on the piston vary with these gas pressures. Therefore, the largest thrust forces act on one side of the piston, termed the major thrust side, which are caused by combustion gas pressures. The opposite side of the piston, termed the minor thrust side, has lower thrust forces caused largely by compression pressures within the combustion chamber 22, which are lower in magnitude than the combustion gas pressures.

Figure 3:
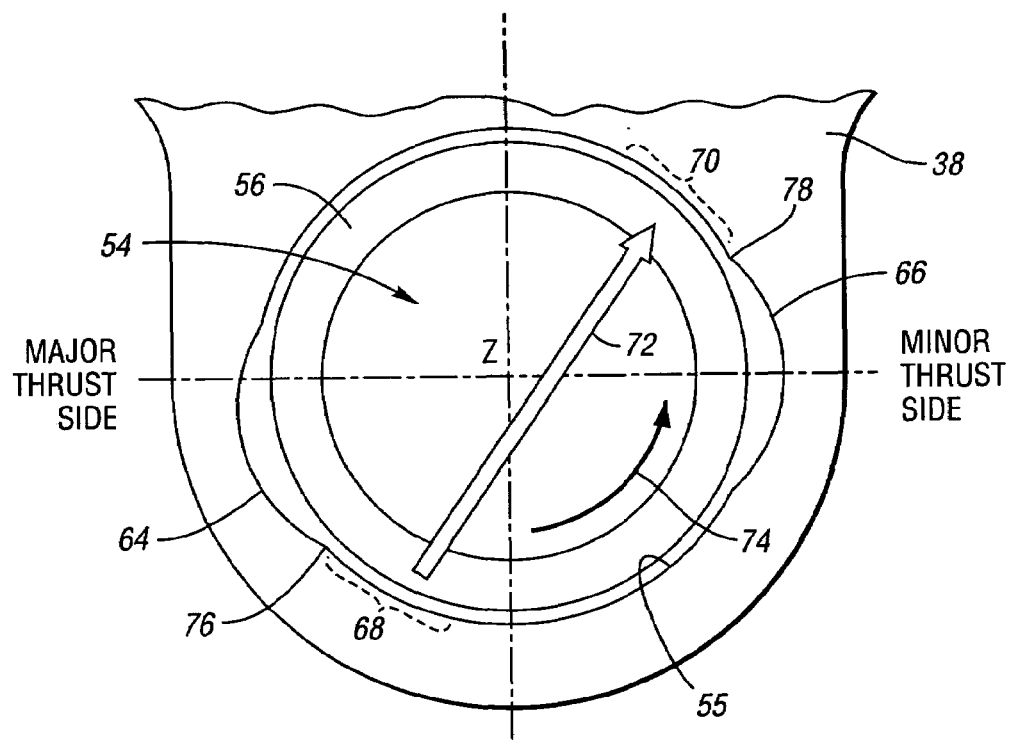
FIG. 3 is a fragmentary view of the pin boss portion of the piston shown in FIG. 1 illustrating the pin bore geometry consistent with the present invention.

With reference to FIG. 3, the piston pin bore 54 has first and second slots 64 and 66 that extend generally axially in the direction of the axis Z of the pin bore 54. The first and second slot 64 and 66 are preferably concave in shape and are adjacently shallow relative to the pin bore surface 55. The first and second slots 64 and 66 are operable to relieve stresses exerted on the pin boss portions 38 and 39 (shown in FIG. 2) by compression deformation of the piston pin 56 caused by the gas load on the piston 20. The first and second slots 64 and 66 are also operable to supply or convey oil to lubricate the piston pin 56 and pin bore surface 55. Those skilled in the art will recognize that the slots 64 and 66 may be of any shape and depth and may or may not extend the entire length of each of the pin boss portions 38 and 39, as shown in FIG. 2.

Referring now to FIG. 3, there is shown a fragmentary view of the pin boss portion 38 illustrating the preferred placement of the first and second slots 64 and 66 with respect to the pin bore surface 55 consistent with the present invention. In a four stroke internal combustion engine, the crankshaft must make two full rotations, i.e. 720 degrees, for each combustion cycle. The first 180 degree rotation is the expansion or power stroke. During the power stoke, the rapidly expanding combustion gases exert force on the piston forcing it from a top dead center (TDC) position or the top of the stroke to a bottom dead center (BDC) position or the bottom of the stroke. It is during the power stroke that the chemical energy of the fuel-air charge mixture is converted to mechanical energy. The rotation from 180 to 360 degrees is the exhaust stroke. During the exhaust stroke, the piston moves from the BDC position to the TDC position forcing the burnt gases or products of combustion from the cylinder. The rotation from 360 to 540 degrees is the intake stroke wherein the air-fuel mixture is introduced into the cylinder as the piston moves from the TDC position to the BDC position. The rotation from 540 to 720 degrees is the compression stroke. During the compression stroke, the air-fuel mixture is compressed as the piston moves from the BDC position to the TDC position, after which time the cycle will repeat.

For crank angles less than approximately 680 degrees after top dead center (ATDC), i.e. approximately 40 degrees before the start of the expansion or power stroke, the gas pressures and inertial forces acting in the piston 20 are such that the piston pin 56 will contact the pin boss portion 38 at contact area 68, shown by a phantom bracket in FIG. 3. As the crankshaft rotates past approximately 680 ATDC, the gas pressure exerted on the piston from the rapid expansion of the burning fuel—air mixture will cause the piston pin 56 to traverse the pin bore 54, following the path shown by arrow 72, and contact the pin boss portion 38 at contact area 70, shown by a phantom bracket. At certain operating conditions, noise may be emitted as the piston pin 56 moves or orients respectively from contact area 68 to contact area 70. This noise may be diminished by reducing the piston pin 56 to pin bore 54 clearances, however the potential decrease in lubrication as a result of the tighter tolerances may result in metal-to-metal contact, or scuffing, between the piston pin 56 and the pin bore surface 55. The arrow 74 of FIG. 3 represents the relative rotational direction of the piston pin 56 within the pin bore 54.

In the preferred embodiment, the slot 64, which is on the major thrust side of the piston, will be provided near the contact area 68 such that the lubrication of the contact area 68 is enhanced as the piston pin 56 rotates within the pin bore 54. By increasing the amount of lubricant at the contact area 68, the elastohydrodynamic (EHD) lubrication film thickness formed thereon effectively reduces the piston pin 56 to pin bore 54 clearance. Likewise, the slot 66, which is on the minor thrust side of the piston, will be provided near the contact area 70 such that the lubrication of the contact area 70 is enhanced as the piston pin 56 rotates within the pin bore 54. By increasing the amount of lubricant conveyable at the contact area 70, the EHD lubrication film thickness formed thereon effectively reduces the piston pin 56 to pin bore 54 clearance. Preferably, trailing edges 76 and 78 of the respective slots 64 and 66 will not intersect the contact areas 68 and 70, respectively. By providing an asymmetric slot configuration, i.e. major thrust side slot 64 is positioned farther from the crown portion 18 than the minor thrust side slot 66, within the piston pin bore surface 55, the noise signature and scuff resistance of the piston pin 56 to pin bore 54 interface may be enhanced. The previously described configuration of slots 64 and 66 may be applied in both fixed pin piston and floating pin piston configurations. Although the discussion concerning the placement of the slots 64 and 66 has focused on the pin boss portion 38, those skilled in the art will recognize that the foregoing discussion may also be applied to the pin boss portion 39.

While the best modes for carrying out the invention have been described in detail, those familiar with the art to which this invention relates will recognize various alternative designs and embodiments for practicing the invention within the scope of the appended claims.

The invention claimed is:

1. A piston having a major thrust side subject to major thrust loads and a minor thrust side subject to minor thrust loads, said piston comprising:
    a crown portion;
    at least one piston pin boss portion extending from said crown portion and defining a generally circumferential piston pin bore surface;
    a first axial slot formed from said piston pin bore surface, said first axial slot being provided on the major thrust side of the piston;
    a second axial slot formed from said piston pin bore surface, said second axial slot being provided on the minor thrust side of the piston;
    wherein said second axial slot is provided closer to said crown portion than said first axial slot; and
    wherein said piston pin bore surface has a first contact area provided proximate to said first axial slot, said first axial slot being operable to provide lubricant to said first contact area.

2. The piston of claim 1, wherein said first and second axial slots are generally concave in shape.

3. The piston of claim 1, wherein said first axial slot has a trailing edge, said trailing edge being provided substantially adjacent to said first contact area.

4. The piston of claim 1, wherein said piston pin bore surface has a second contact area provided proximate to said second axial slot, said second axial slot being operable to provide lubricant to said second contact area.

5. The piston of claim 4, wherein said second axial slot has a trailing edge, said trailing edge being provided substantially adjacent to said second contact area.

6. A piston comprising:
    a crown portion;
    a first skirt portion depending from said crown portion and subject to major thrust loading;
    a second skirt portion depending from said crown portion and subject to minor thrust loading;
    a first pin boss portion integrally formed with said crown portion and disposed between said first and second skirt portions;
    a second pin boss portion formed integrally with said crown portion and spaced axially from said first pin boss portion, said second pin boss portion being disposed between said first and second skirt portions;
    wherein said first and second pin boss portions define an axially extending piston pin bore having a generally circumferential surface and operable to receive a piston pin;
    a first axially extending slot formed in said piston pin bore on the side of the piston subject to major thrust loading and a second axially extending slot formed in said piston pin bore on the side of the piston subject to minor thrust loading;
    wherein said first and second axially extending slots are generally concave in shape;
    wherein said second axially extending slot is provided in said piston pin bore closer to said crown portion than said first axially extending slot; and
    wherein said circumferential surface has a first contact area provided proximate to said first axially extending slot and operable to provide a bearing surface for said piston pin, said first axially extending slot being operable to provide lubricant to said first contact area.

7. The piston of claim 6, wherein the first and second axially extending slot extends the entire length of said piston pin bore.

8. The piston of claim 6, wherein said first axially extending slot has a trailing edge, said trailing edge being provided substantially adjacent to said first contact area.

9. The piston of claim 6, wherein said circumferential surface has a second contact area provided proximate to said second axially extending slot and operable to provide a bearing surface for said piston pin, said second axially extending slot being operable to provide lubricant to said second contact area.

10. The piston of claim 9, wherein said second axially extending slot has a trailing edge, said trailing edge being provided substantially adjacent to said second contact area.

11. A piston comprising:
    a crown portion;
    a first skirt portion depending from said crown portion and subject to major thrust loading;
    a second skirt portion depending from said crown portion and subject to minor thrust loading;
    a first pin boss portion integrally formed with said crown portion and disposed between said first and second skirt portions;
    a second pin boss portion formed integrally with said crown portion and spaced axially from said first pin boss portion, said second pin boss portion being disposed between said first and second skirt portions;
    wherein said first and second pin boss portions define an axially extending piston pin bore having a generally circumferential surface and operable to receive a piston pin;
    a first axially extending slot formed in said piston pin bore on the side of the piston subject to major thrust loading and a second axially extending slot formed in said piston pin bore on the side of the piston subject to minor thrust loading;
    wherein said first and second axially extending slots are generally concave in shape;
    wherein said second axially extending slot is provided in said piston pin bore closer to said crown portion than said first axially extending slot; and
    wherein the first and second axially extending slot extends the entire length of said piston pin bore.

12. The piston of claim 11, wherein said circumferential surface has a first contact area provided proximate to said first axially extending slot and operable to provide a bearing surface for said piston pin, said first axially extending slot being operable to provide lubricant to said first contact area.

13. The piston of claim 12, wherein said first axially extending slot has a trailing edge, said trailing edge being provided substantially adjacent to said first contact area.

14. The piston of claim 11, wherein said circumferential surface has a second contact area provided proximate to said second axially extending slot and operable to provide a bearing surface for said piston pin, said second axially extending slot being operable to provide lubricant to said second contact area.

15. The piston of claim 14, wherein said second axially extending slot has a trailing edge, said trailing edge being provided substantially adjacent to said second contact area.

* * * * *